(12) United States Patent
Kim et al.

(10) Patent No.: US 12,307,212 B2
(45) Date of Patent: May 20, 2025

(54) METHOD FOR PROVIDING REMOTE SERVICE CAPABLE OF MULTILINGUAL INPUT AND SERVER PERFORMING THE SAME

(71) Applicant: ERmind Co., Ltd., Seoul (KR)

(72) Inventors: Jeong Moon Kim, Seoul (KR); Chul Oh Park, Incheon (KR); Min Chul Kim, Seoul (KR)

(73) Assignee: ERmind Co., Ltd., Seoul (KR)

( * ) Notice: Subject to any disclaimer, the term of this patent is extended or adjusted under 35 U.S.C. 154(b) by 436 days.

(21) Appl. No.: 17/319,054

(22) Filed: May 12, 2021

(65) Prior Publication Data
US 2022/0309253 A1    Sep. 29, 2022

(30) Foreign Application Priority Data
Mar. 23, 2021    (KR) .................... 10-2021-0037469

(51) Int. Cl.
*G06F 40/58* (2020.01)
*G06F 3/14* (2006.01)
*G06F 9/451* (2018.01)

(52) U.S. Cl.
CPC .................... *G06F 40/58* (2020.01)

(58) Field of Classification Search
CPC . G06F 40/58; G06F 3/14; G06F 9/454; G06F 3/1454; G06F 9/45545; G06F 16/958
USPC .......................................................... 704/9
See application file for complete search history.

(56) References Cited

U.S. PATENT DOCUMENTS

| | | | | |
|---|---|---|---|---|
| 7,167,519 B2* | 1/2007 | Comaniciu | ............ | H04N 19/17 |
| | | | | 375/E7.181 |
| 10,587,612 B2* | 3/2020 | Linszner | ............... | H04L 63/083 |
| 2008/0082317 A1* | 4/2008 | Rosart | ................... | G06F 40/263 |
| | | | | 704/8 |
| 2008/0221900 A1* | 9/2008 | Cerra | .................. | H04M 3/4938 |
| | | | | 704/270.1 |
| 2010/0115454 A1* | 5/2010 | Tuli | ........................ | H04L 67/59 |
| | | | | 715/780 |
| 2015/0269271 A1 | 9/2015 | Liu et al. | | |
| 2015/0347364 A1* | 12/2015 | Zhang | ................. | G06F 3/04883 |
| | | | | 715/802 |
| 2019/0295532 A1* | 9/2019 | Ammedick | ............. | G10L 15/22 |

(Continued)

FOREIGN PATENT DOCUMENTS

| AU | 2006232673 A1 * | 11/2007 | ......... G06F 16/9577 |
|---|---|---|---|
| EP | 3499383 A1 | 6/2019 | |

(Continued)

OTHER PUBLICATIONS

Ohara S, Mar. 2015, WO-2015029193-A1, Cited portions of the English translation (Year: 2015).*

*Primary Examiner* — Hai Phan
*Assistant Examiner* — Ian Scott McLean
(74) *Attorney, Agent, or Firm* — INVENSTONE PATENT, LLC (57) ABSTRACT

The present disclosure relates to a method for providing a remote service capable of inputting multi-languages and the method includes receiving a text, acquired from a user terminal using a remote service to be input to a virtual input window; generating an input object displaying the virtual input window including the text; and transmitting the input object to the user terminal.

7 Claims, 10 Drawing Sheets

(56) References Cited

U.S. PATENT DOCUMENTS

2020/0334411 A1* 10/2020 Patel .................. H04L 67/10
2020/0371734 A1* 11/2020 Kawano ............... G06F 3/0416

FOREIGN PATENT DOCUMENTS

| KR | 10-2016-0049626 A | 5/2016 | | |
| KR | 10-2019-0138436 A | 12/2019 | | |
| WO | WO-2015029193 A1 * | 3/2015 | ............ | G06F 16/211 |

* cited by examiner

METHOD FOR PROVIDING REMOTE SERVICE CAPABLE OF MULTILINGUAL INPUT AND SERVER PERFORMING THE SAME

CROSS-REFERENCE TO RELATED APPLICATIONS

This application claims the priority of Korean Patent Application No. 10-2021-0037469 filed on Mar. 23, 2021, in the Korean Intellectual Property Office, the disclosure of which is incorporated herein by reference.

BACKGROUND

Field

The present disclosure relates to a method for providing a remote service capable of inputting multi-languages and a server performing the same.

Description of the Related Art

The rapid development of the Internet has resulted in rapid improvement in personal communication speed. The improvement of personal communication speed provides an environment in which a personal terminal (hereinafter, referred to as a client terminal) is connected to a remote computer (a host system) to download or upload a large amount of data, or uses a remote computer control program to use a remote computer as if the user is locally logged in the remote computer.

Further, As applications are being developed in various ways, many virtualization techniques have been proposed for driving applications that require high performance in client terminals with relatively low performance.

Therefore, the host system should build an environment capable of processing all input data input from the client terminals. However, when input settings of the client terminals are different, an inefficient process of building a new environment has to be preceded.

The background of the present disclosure is described for easier understanding of the present disclosure. It should not be understood to admit the matters described in the background of the present disclosure as a prior art.

SUMMARY

Accordingly, a novel method for processing input data of the client terminal without building an environment for a client terminal in one remote system (host system) is required.

The inventors of the present disclosure tried to develop a method for increasing a service providing efficiency by acquiring a user's text input by using an input module/input device implemented in a user terminal (a client terminal) in a remote service system and by converting the user's text into an image or a video object, and to be output on a remote service screen, thereby improving the service providing efficiency.

Specifically, the inventors of the present disclosure have come to develop a method for reducing a computational amount of a server. Here, the server provides a remote service to a plurality of user terminals by detecting a region in which the text input by the user in a remote service screen can be displayed, and outputting the text in the detected region in real time.

Objects of the present disclosure are not limited to the above-mentioned objects, and other objects, which are not mentioned above, can be clearly understood by those skilled in the art from the following descriptions.

In order to achieve the above-described objects, a method for providing a remote service capable of inputting multi-languages according to an exemplary embodiment of the present disclosure is provided. The method is configured to include receiving a text, acquired from a user terminal using a remote service, to be input to a virtual input window; generating an input object displaying the virtual input window including the text; and transmitting the input object to the user terminal.

According to an aspect of the present disclosure, the input object is an image or a video for a partial area of the remote service screen displayed on the user terminal.

According to another aspect of the present disclosure, the input object is an image or a video representing any one input window among a plurality of input windows displayed on a display device of the user terminal.

According to still another aspect of the present disclosure, the method may further include: before the receiving of a text, providing a guide text for searching to the virtual input window.

According to still another aspect of the present disclosure, the input object may be input in a position selected by the user terminal.

According to still another aspect of the present disclosure, the text may be letters configured by any one type of language selected among a plurality of languages, by the user terminal.

According to still another aspect of the present disclosure, the method may further include: before the receiving of a text, detecting a position of a virtual input window in the remote service screen where the text is capable of being displayed.

According to still another aspect of the present disclosure, the transmitting may be performed by designating the position of the input object to the detected position of the virtual input window.

According to still another aspect of the present disclosure, the receiving of a text may be receiving a text acquired from a physical input device connected to the user terminal or a display device on the user terminal, and entered into the virtual input window.

According to still another aspect of the present disclosure, the method may further include: before the receiving of a text, providing a remote service screen rendered in accordance with the request of the user terminal.

According to still another aspect of the present disclosure, the remote service screen may be a screen for any one application or web page.

In order to achieve the above-described object, a method for using a remote service capable of inputting multi-languages according to another exemplary embodiment of the present disclosure is provided. The method is configured to include receiving position information of a virtual input window in a remote service screen from a remote service server; acquiring a text input to the virtual input window to transmit the text to the remote service server; and receiving an input object displaying the virtual input window from the remote service server and outputting the input object in accordance with the received position information.

In order to achieve the above-described object, a service providing server according to still another exemplary embodiment of the present disclosure is provided. The server includes: a communication interface, a memory; and a processor which is operably connected to the communication interface and the memory, and the processor is configured to receive a text which is acquired from a user terminal which is using a remote service to be input to a virtual input window, generate an input object displaying the virtual input window including the text, and transmit the input object to the user terminal.

In order to achieve the above-described object, a user terminal according to still another exemplary embodiment of the present disclosure is provided. The terminal includes a communication interface, a memory, and a processor which is operably connected to the communication interface and the memory, and the processor is configured to receive a position of a virtual input window in a remote service screen selected by a remote service server, acquire a text input to the virtual input window to transmit the text to the remote service server, and receive and output an input object displaying the virtual input window from the remote service server.

Other detailed matters of the exemplary embodiments are included in the detailed description and the drawings.

According to the present disclosure, even though an input device/input interface installed in a user terminal is not implemented in a server which provides a remote service, a text to be input into a remote service screen by a user may be output as an input text.

Further, according to the present disclosure, only an operation of generating or providing a text acquired from the user terminal as an image or a video input object is performed without installing an input program for every language in a server which provides a remote service so that a development cost for implementing a remote service is reduced and a computational amount of the service providing server is also reduced.

Further, according to the present disclosure, the remote service may be provided simultaneously to many user terminals through one remote service providing engine.

The effects according to the present disclosure are not limited to the contents exemplified above, and more various effects are included in the present disclosure.

BRIEF DESCRIPTION OF THE DRAWINGS

The above and other aspects, features and other advantages of the present disclosure will be more clearly understood from the following detailed description taken in conjunction with the accompanying drawings, in which:

FIGS. 6 to 9B are exemplary views for explaining a remote service providing screen according to an exemplary embodiment of the present disclosure.

DETAILED DESCRIPTION OF THE EMBODIMENT

Advantages and characteristics of the present disclosure and a method of achieving the advantages and characteristics will be clear by referring to exemplary embodiments described below in detail together with the accompanying drawings. However, the present disclosure is not limited to the following exemplary embodiments but may be implemented in various different forms. The exemplary embodiments are provided only to complete the disclosure of the present disclosure and to fully provide a person having ordinary skill in the art to which the present disclosure pertains with the category of the disclosure, and the present disclosure will be defined by the appended claims. With regard to the description of drawings, like reference numerals denote like components.

In this specification, the terms "have", "may have", "include", or "may include" represent the presence of the characteristic (for example, a numerical value, a function, an operation, or a component such as a part), but do not exclude the presence of additional characteristic.

In the specification, the terms "A or B", "at least one of A or/and B", or "at least one or more of A or/and B" may include all possible combinations of enumerated items. For example, the terms "A or B", "at least one of A and B", or "at least one of A or B" may refer to an example which includes (1) at least one A, (2) at least one B, or (3) all at least one A and at least one B.

Although the terms "first", "second", and the like, may be used herein to describe various components regardless of an order and/or importance, the components are not limited by these terms. These terms are only used to distinguish one component from another. For example, a first user device and a second user device may refer to different user devices regardless of the order or the importance. For example, without departing from the scope of the present disclosure, a first component may be referred to as a second component, and similarly, a second component may be referred to as a first component.

When a component (for example, a first component) is referred to as being "operatively or communicatively coupled with/to" or "connected to" another component (for example, a second component), it can be understood that the component is directly connected to the other element, or connected to the other element via another component (for example, a third component). In contrast, when a component (for example, a first component) is referred to as being "directly coupled with/to" or "directly connected to" another component (for example, a second component), it is understood that there may not be another component (for example, a third component) between the components.

The terms "configured to (or set to)" may be exchangeably used with "suitable for", "having the capacity to", "designed to", "adapted to", "made to", or "capable of" depending on the situation. The terms "configured to (or set)" may not necessarily mean only "specifically designed to" in a hardware manner. Instead, in some situation, the terms "a device configured to" may mean that the device is "capable of" something together with another device or components. For example, the terms "a processor configured (or set) to perform A, B, and C" may refer to a dedicated processor (for example, an embedded processor) configured to perform the corresponding operation or a generic-purpose processor (for example, a CPU or an application processor)

which is capable of performing the corresponding operations by executing one or more software programs stored in a memory device.

The terms used in this specification are merely used to describe a specific embodiment, but do not intend to limit the scope of another embodiment. A singular form may include a plural form if there is no clearly opposite meaning in the context. Terms used herein including technical or scientific terms may have the same meaning as commonly understood by those skilled in the art. Among the terms used in this specification, terms defined in the general dictionary may be interpreted as having the same or similar meaning as the meaning in the context of the related art, but is not ideally or excessively interpreted to have formal meanings unless clearly defined in this specification. In some cases, even though the terms are defined in this specification, the terms are not interpreted to exclude the embodiments of the present specification.

The features of various embodiments of the present disclosure can be partially or entirely bonded to or combined with each other and can be interlocked and operated in technically various ways understood by those skilled in the art, and the embodiments can be carried out independently of or in association with each other.

For clarity of interpretation of the present specification, terms used in the present specification will be defined below.

Prior to the description of the present disclosure, a "remote service" defined in the present disclosure may be understood as a series of services. Here, the services may be provided between a host and a client with a network connection established. Specifically, the remote host system executes an application or a web page in accordance with a request from a client terminal, and provides a screen to the client terminal. The user can experience as if the application or the web page is executed in the client terminal.

Figure 1:
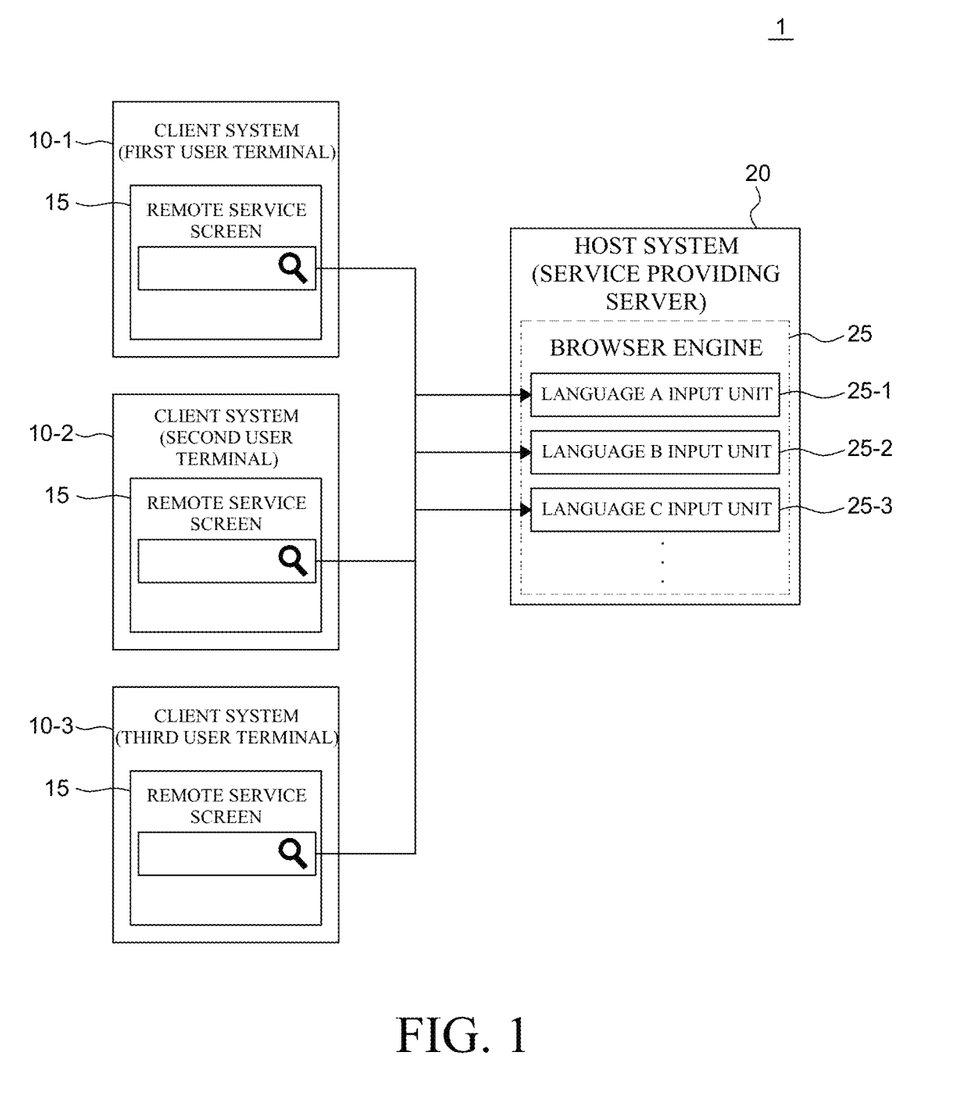
FIG. 1 is a schematic view for explaining an outline of a method for providing a remote service capable of inputting multi-languages of the related art.

FIG. 1 is a schematic view for explaining an outline of a method for providing a remote service capable of inputting multi-languages of the related art.

Referring to FIG. 1, a remote service system 1 of the related art may include a plurality of client systems (user terminals) 10-1, 10-2, and 10-3 which receive a remote service. A host system (a service providing server) 20 may provide a remote service. The service providing server 20 may include a browser engine 25 for processing a request of the user terminal.

It is required that the browser engine 25 of the related art may receive different types of languages from the plurality of user terminals 10-1, 10-2, and 10-3, and provide them to each remote service screens 15. To this end, the browser engine 25 has to develop and install language input units 25-1, 25-2, and 25-3 for every language which receive different types of languages, and there is a problem in that a cost increases accordingly.

If the number of user terminals receiving the remote service is increased, the service providing server 20 is required to include a plurality of browser engines 25 and a cost for developing and installing language input units therein is added so that the remote services operate inefficiently.

Therefore, according to the present disclosure, a system for efficiently operating the remote service has been developed, which will be described below.

Figure 2:
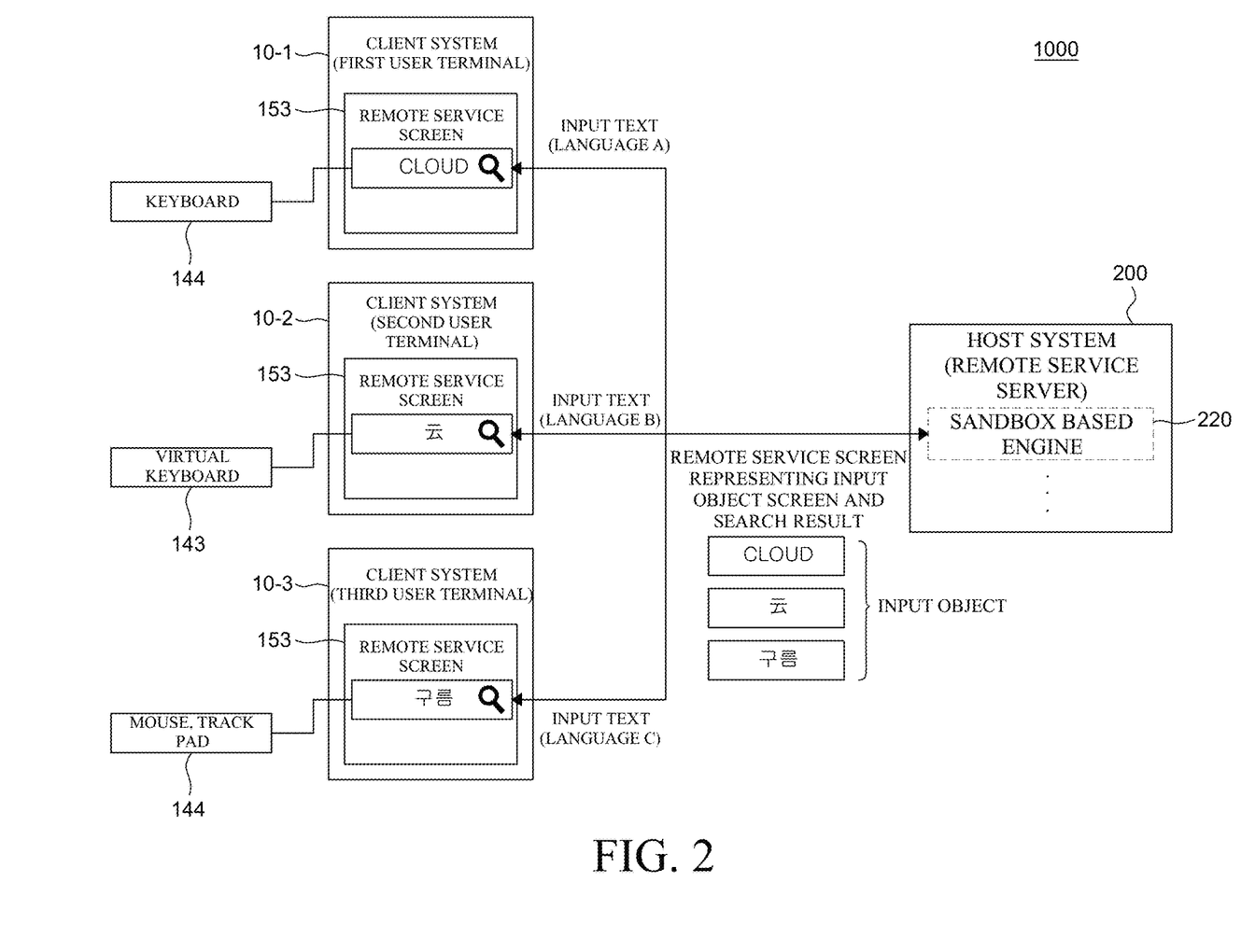
FIG. 2 is a schematic view of a system for providing a remote service capable of inputting multi-languages according to an exemplary embodiment of the present disclosure.

FIG. 2 is a schematic view of a system for providing a remote service capable of inputting multi-languages according to an exemplary embodiment of the present disclosure.

Referring to FIG. 2, the system for providing a remote service capable of inputting multi- languages (hereinafter, simply referred to as a remote service providing system) 1000 may include a plurality of user terminals 10-1, 10-2, and 10-3 and a remote service server 200.

The remote service providing system 1000 may provide a remote service to the plurality of user terminals 10-1, 10-2, and 10-3 without installing a language input unit in the remote service server 200. The input data from user terminal 100 can be obtained through an input unit embedded in each terminal. Here, the plurality of user terminals 10-1, 10-2, and 10-3 may include various electronic devices including a display device which may output a remote service screen, such as a smart phone, a PC, or a tablet PC.

The remote service providing system 1000 may acquire languages such as English, Chinese, or Thai that mean "cloud", by means of a keyboard 144 connected to the first user terminal 10-1, a virtual keyboard 143 displayed on the second user terminal 10-2, and a mouse or a track pad 144 connected to the third third user terminal 10-3. The remote service providing system 1000 may provide the languages to the remote service server 200. A sandbox-based engine 220 in the remote service server 200 may generate an input object representing the entire text for every language as an image to provide the input object to the remote service screen 153 of the user terminal 100.

That is, when only the remote service screen 153 in the plurality of user terminals 10-1, 10-2, and 10-3 is observed, the remote service providing system 1000 may be considered as the same as the system of the related art. However, the remote service providing system 1000 uses an input device for each language already in use on user terminal 100, it is possible to save costs and resources for processing the input data from remote services.

So far, the configuration of the remote service providing system 1000 according to the exemplary embodiment of the present disclosure has been briefly described. Hereinafter, configurations of a user terminal 100 using a virtual computing service (a remote service) and a remote service server 200 providing this service will be described in detail with reference to FIGS. 3 to 9.

Figure 3:
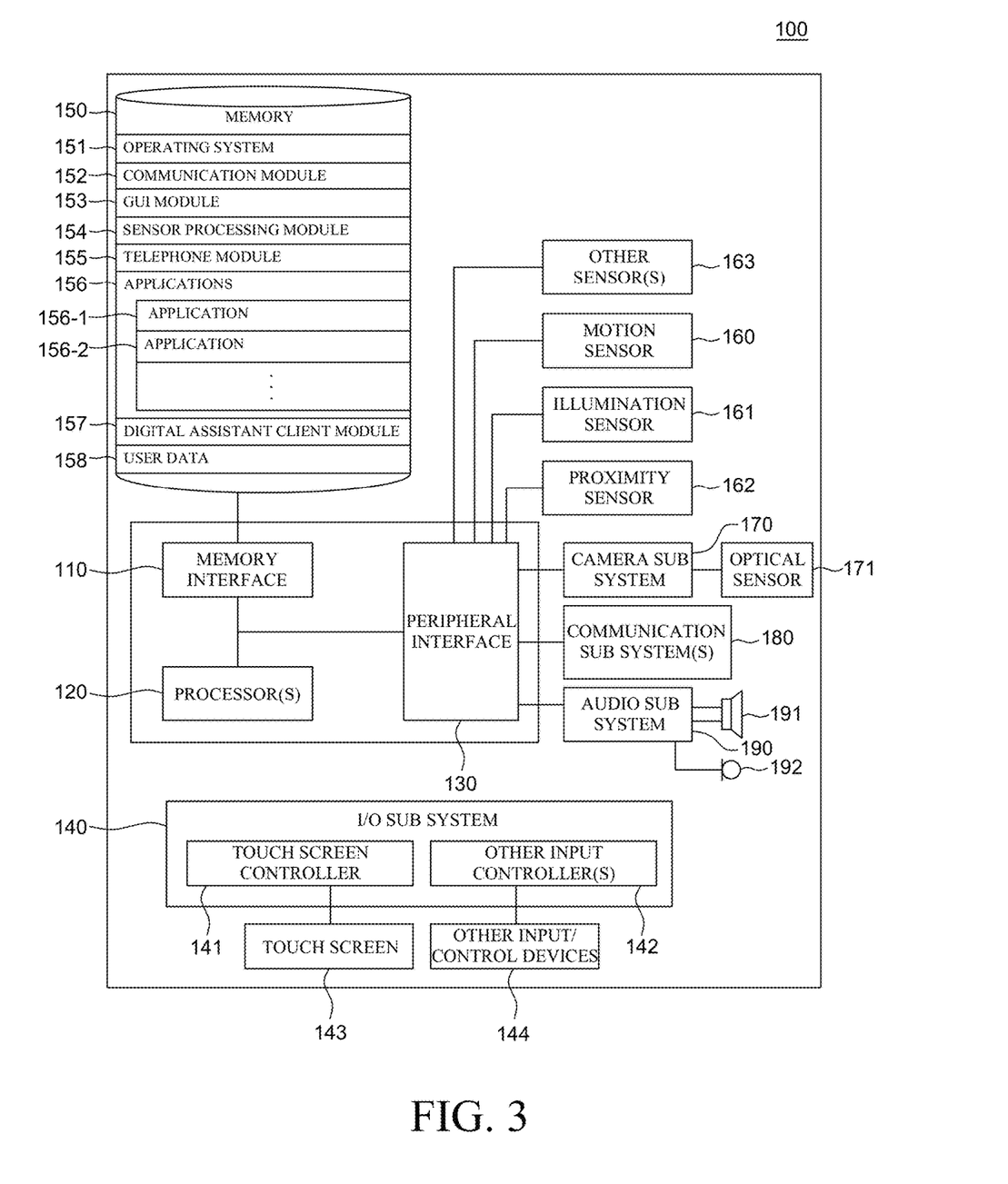
FIG. 3 is a block diagram illustrating a configuration of a user terminal according to an exemplary embodiment of the present disclosure.
Figure 4:
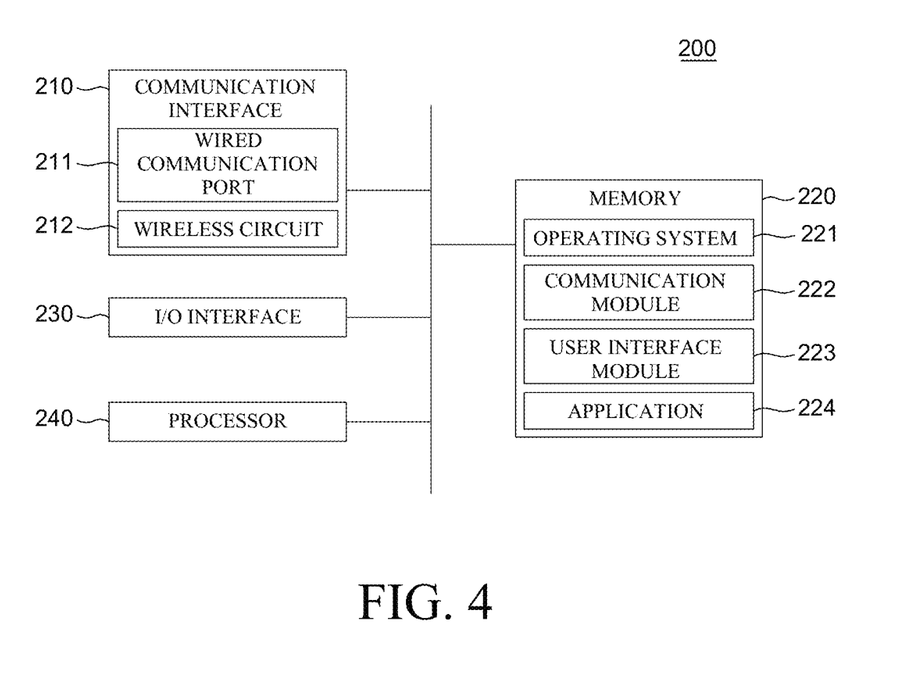
FIG. 4 is a block diagram illustrating a configuration of a remote service server according to an exemplary embodiment of the present disclosure.
Figure 5:
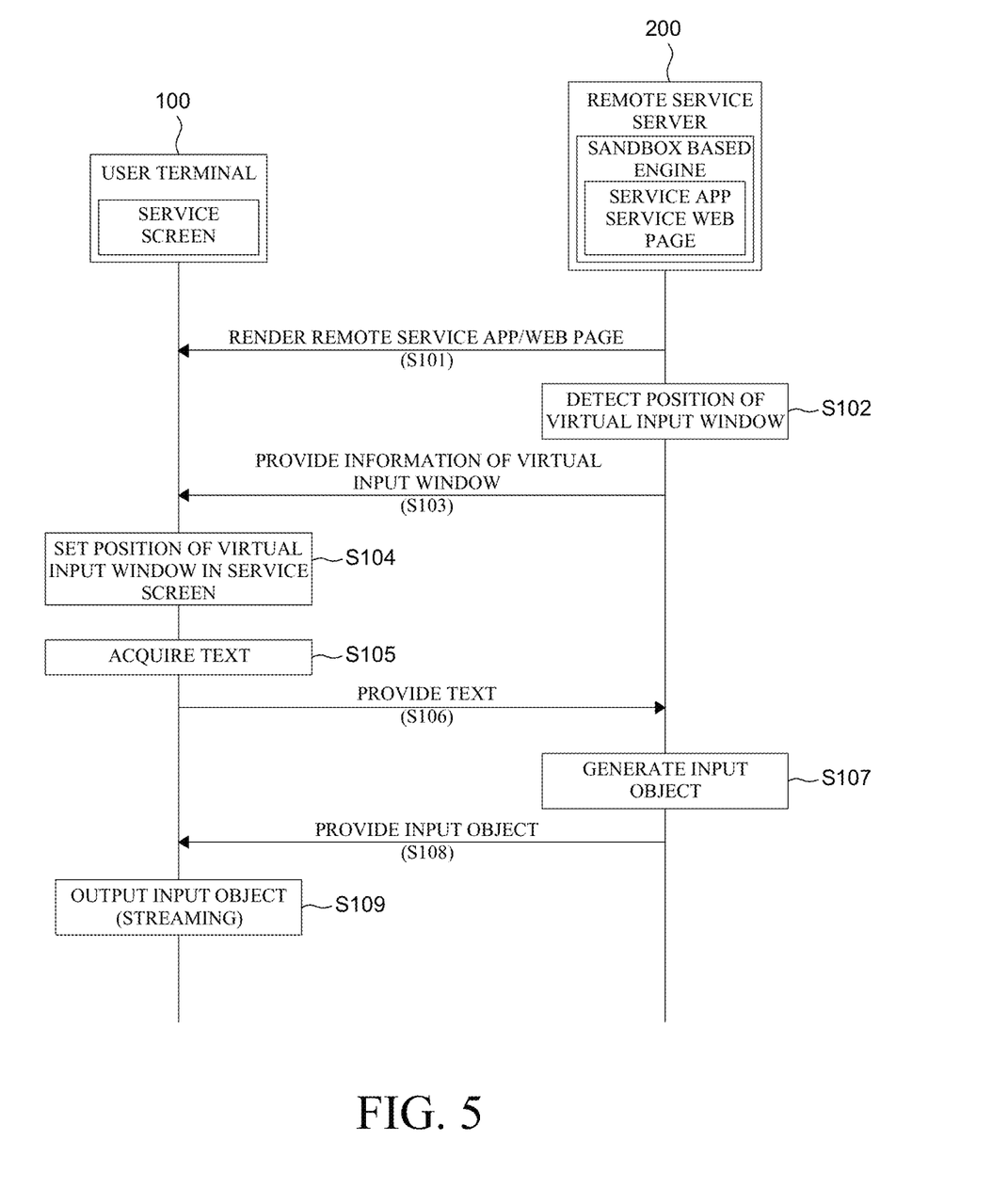
FIG. 5 is a flowchart illustrating a remote service providing method according to an exemplary embodiment of the present disclosure.

FIG. 3 is a block diagram illustrating a configuration of a user terminal according to an exemplary embodiment of the present disclosure. FIG. 4 is a block diagram illustrating a configuration of a remote service server according to an exemplary embodiment of the present disclosure. FIG. 5 is a flowchart illustrating a remote service providing method according to an exemplary embodiment of the present disclosure. FIGS. 6 to 9B are exemplary views for explaining a remote service providing screen according to an exemplary embodiment of the present disclosure.

First, referring to FIG. 3, the user terminal 100 may include a memory interface 110, one or more processors 120, and a peripheral interface 130. Various components in the user terminal 100 may be connected by one or more communication buses or signal lines.

The memory interface 110 is connected to a memory 150 to transmit various data to the processor 120. Here, the memory 150 may include at least one type of storing media of a flash memory type, a hard disk type, a multimedia card micro type, a card type memory (for example, an SD or XD memory), a RAM, an SRAM, a ROM, an EEPROM, a PROM, a network storage, a cloud, and a block chain database.

In various exemplary embodiments, the memory 150 may store at least one of an operating system 151, a communication module 152, a graphic user interface module (GUI) 153, a sensor processing module 154, a telephone module 155, and an application 156. Specifically, the operating system 151 may include a command for processing a basic system service and a command for performing hardware tasks. The communication module 152 may communicate with at least one of the other devices, a computer, and a server. The graphic user interface module (GUI) 153 may process a graphic user interface. The sensor processing module 154 may process sensor-related functions (for example, process a received voice input using one or more microphones 192). The telephone module 155 may process telephone-related functions. The application module 156 may perform various functions of the user application, such as electronic messaging, web browsing, media processing, searching, imaging, or other processing functions. Further, the user terminal 100 may store one or more software applications 156-1 and 156-2 related to any one type of service in the memory 150.

In various exemplary embodiments, the memory 150 may store a digital assistant client module 157 (hereinafter, simply referred to as a DA client module). Accordingly, the memory 150 may store commands for performing a function of the client of the digital assistant and various user data 158 (for example, other data such as user-customized vocabulary data, preference data, user's electronic address book, a to-do list, or a shopping list).

In the meantime, the DA client module 157 may acquire voice input, text input, touch input and/or gesture input of the user by means of various user interfaces (for example, I/O sub system 140) equipped in the user terminal 100.

Further, the DA client module 157 may output audio-visual or tactile data. For example, the DA client module 157 may output data formed of a combination of at least two or more of voice, sound, a notice, a text message, a menu, a graphic, a video, an animation, and a vibration. Further, the DA client module 157 may communicate with a digital assistant server (not illustrated) using a communication sub system 180.

In various exemplary embodiments, the DA client module 157 may collect additional information about the surrounding environment of the user terminal 100 from various sensors, sub systems, and peripheral devices to configure a context associated with the user input. For example, the DA client module 157 may infer the intention of the user by providing context information to the digital assistant server together with the user input. Here, the context information which may be accompanied by the user input may include sensor information, such as light, ambient noises, ambient temperature, an image of the surrounding environment, and a video. As another example, the context information may include a physical state (for example, a device alignment, a device position, a device temperature, a power level, a speed, an acceleration, a motion pattern, or a cellular signal intensity) of the user terminal 100. As another example, the context information may include information related to a software state of the user terminal 100 (for example, a process which is being executed in the user terminal 100, installed program, past and present network activities, a background service, an error log, or resource usage).

According to various exemplary embodiments, the memory 150 may include added or deleted commands and further, the user terminal 100 may also include additional configurations other than the configurations illustrated in FIG. 3 or exclude some configurations.

The processor 120 may control an overall operation of the user terminal 100 and run an application or a program stored in the memory 150 to perform various commands to use a remote service capable of inputting multi-languages.

According to an exemplary embodiment, after receiving position information of a virtual input window in a remote service screen to which a text is input from the remote service server 200 via the communication module 152, the processor 120 can acquires the texts that is inputted into the virtual input window by the input of the user's input and transmit it to the remote service server 200. Specifically, when the processor 120 receives a user input which connotes a meaning related to input termination such as "search, transmit, or confirm", the processor 120 may transmit a text completely input to the remote service server 200 via the communication module 152. Here, the text is letters configured by any one language selected from a plurality of languages, by the user terminal 100 and various user inputs including the text may be acquired from a physical input device connected to the user terminal 100, such as a keyboard, a mouse, or a track pad or a display device (a touch screen 143) of the user terminal 100.

The processor 120 may receive an input object displaying a virtual input window through the communication module 152 and output the input object in accordance with the received position information. Specifically, the remote service screen being displayed on the user terminal 100 is an application screen or a web page screen rendered by the remote service server 200 in real time. The input object may be an image of a partial area of the remote service screen displayed on the user terminal 100.

Figure 7:
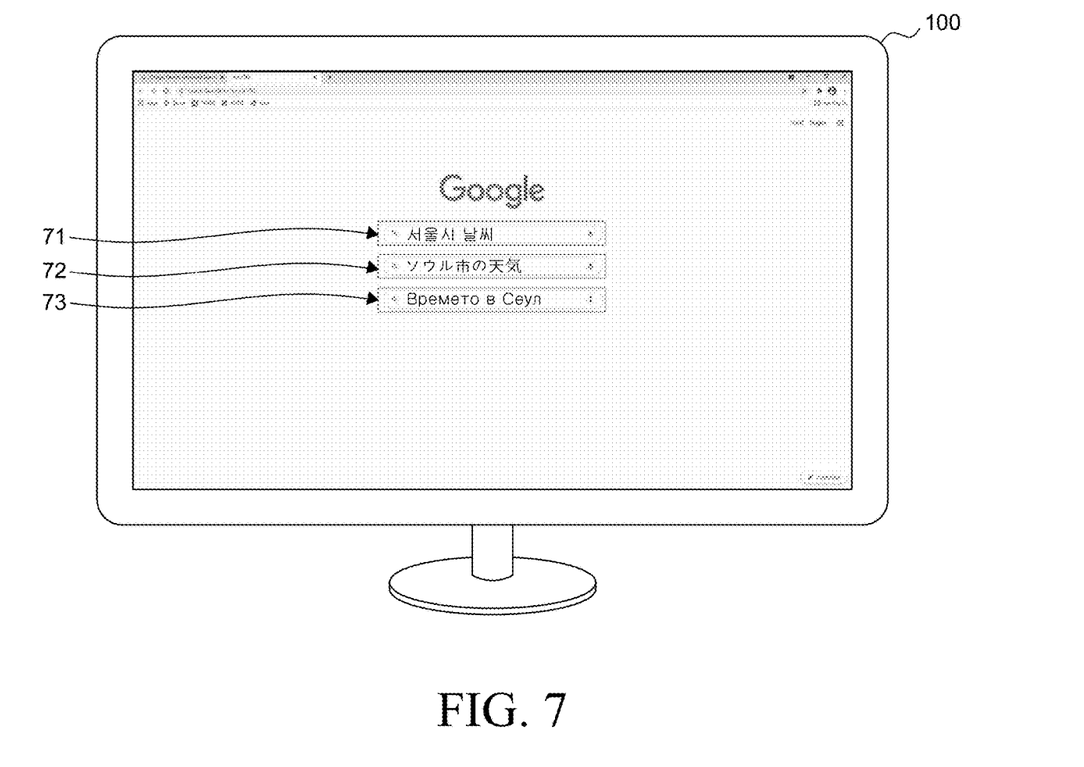

With regard to this, referring to FIG. 7, the input object may be an image including (1) an image of an input window defined to input a text in the remote service screen in the user terminal 100. The input object may be an image including (2) a text acquired from the user terminal 100.

That is, the input object may be an image indicating any one input window of the plurality of input windows displayed on the display device of the user terminal 100. The input objects 71, 72, and 73 may be provided to include various languages in the input windows depending on which text is acquired from the user terminal 100.

The processor 120 may acquire a text in real time to transmit the text to the remote service server 200 via the communication module 152. Also, the processor 120 may receive the input object including the text in real time, without receiving the user input such as "search, transmit, and confirm". Accordingly, the input object may be an image for a partial area of the remote service screen.

For example, when the processor 120 acquirers "Weather of Seoul" in real time to transmit it to the remote service server 200 via the communication module 152, an image about the input object is received from the remote service server 200 to be reproduced on the touch screen 143.

Referring to FIG. 3 again, the processor 120 may correspond to an arithmetic device such as a central processing unit (CPU) or an application processor (AP). Further, the processor 120 may be implemented as an integrated chip (IC) such as a system on chip (SoC) in which various arithmetic devices are integrated.

The peripheral interface 130 is connected to various sensors, sub systems, and peripheral devices to provide data to allow the user terminal 100 to perform various functions. Here, when the user terminal 100 performs any function, it is understood that the function is performed by a processor 120.

The peripheral interface 130 may receive data from a motion sensor 160, an illumination sensor (an optical sensor) 161, and a proximity sensor 162 and by doing this, the user terminal 100 may perform alignment, light, and proximity sensing functions. As another example, the peripheral interface 130 may be provided with data from other sensors 163 (a positioning system-GPS receiver, a temperature sensor, or a biometric sensor) and by doing this, the user terminal 100 may perform functions related to the other sensors 163.

In various exemplary embodiments, the user terminal 100 may include a camera sub system 170 connected to the peripheral interface 130 and an optical sensor 171 connected thereto and by doing this, the user terminal 100 may perform various photographing functions such as taking a picture or recording a video clip.

In various exemplary embodiments, the user terminal 100 may include a communication sub system 180 connected to the peripheral interface 130. The communication sub system 180 is configured by one or more wired/wireless networks and may include various communication ports, a wireless frequency transceiver, and an optical transceiver.

In various exemplary embodiments, the user terminal 100 includes an audio sub system 190 connected to the peripheral interface 130 and the audio sub system 190 includes one or more speakers 191 and one or more microphones 192 so that the user terminal 100 may perform voice-operated functions, such as voice recognition, voice duplication, digital recording, and telephone functions.

In various exemplary embodiments, the user terminal 100 may include an I/O sub system 140 connected to the peripheral interface 130. For example, the I/O sub system 140 may control the touch screen 143 included in the user terminal 100 by means of a touch screen controller 141. For example, the touch screen controller 141 may use any one of a plurality of touch sensing techniques such as a capacitive type, a resistive type, an infrared type, a surface acoustic wave technology, or a proximity sensor array to detect contact and movement of the user or stopping of contact and movement. As another example, the I/O sub system 140 may control the other input/control device 144 included in the user terminal 100 by means of other input controller(s) 142. As an example, other input controller(s) 142 may control one or more buttons, rocker switches, thumb-wheels, infrared ports, USB ports, and pointer devices such as a stylus.

Next, referring to FIG. 4, the remote service server 200 may include a communication interface 210, a memory 220, an I/O interface 230, and a processor 240 and each configuration may communicate with each other via one or more communication buses or signal lines.

The communication interface 210 may be connected to the plurality of user terminals 100 via a wired/wireless communication network to exchange data. For example, the communication interface 210 may receive a text from the user terminal 100 and transmit an input object generated based thereon to the user terminal 100.

In the meantime, the communication interface 210 which enables the transmission/reception of the data includes a wired communication port 211 and a wireless circuit 212 and the wired communication port 211 may include one or more wired interfaces, such as Ethernet, universal serial bus (USB), and fire wire. Further, the wireless circuit 212 may transmit and receive data with external devices by an RF signal or an optical signal. In addition, the wireless communication may use at least one of a plurality of communication standards, protocols, and technologies, such as GSM, EDGE, CDMA, TDMA, Bluetooth, Wi-Fi, VoIP, Wi-Max, or other arbitrary appropriate communication protocols.

The memory 220 may store various data used in the remote service server 200. For example, the memory 220 may store identification information of the user terminal 100 providing a remote service for every sandbox-based engine.

In various exemplary embodiments, the memory 220 may include a volatile or nonvolatile recording medium which may store various data, commands, and information. For example, the memory 220 may include at least one type of storing media of a flash memory type, a hard disk type, a multimedia card micro type, a card type memory (for example, an SD or XD memory), a RAM, an SRAM, a ROM, an EEPROM, a PROM, a network storage, a cloud, and a block chain database.

In various exemplary embodiments, the memory 220 may store a configuration of at least one of the operating system 221, the communication module 222, the user interface module 223, and one or more applications 224.

The operating system 221 (for example, an embedded operating system such as LINUX, UNIX, MAC OS, WINDOWS, VxWorks) may include various software components and drivers which control and manage a general system task (for example, memory management, storage device control, or power management) and The operating system 221 support communication between various hardware, firmware, and software components.

The communication module 220 may support communication with other devices through the communication interface 210. The communication module 220 may include various software configuration elements for processing data received by a wired communication port 211 or a wireless circuit 212 of the communication interface 210.

The user interface module 223 may receive a request or an input of the user from the keyboard, the touch screen, or the microphone via the I/O interface 230 and provide the user interface on the display.

The application 224 may include a program or a module configured to be executed by one or more processors 240. Here, the application for providing the remote service may be performed on a server farm.

The I/O interface 230 may connect at least one of the input/output devices (not illustrated) of the remote service server 200, such as a display, a keyboard, a touch screen, and a microphone, to the user interface module 223. The I/O interface 230 may receive the user input (for example, voice input, keyboard input, or touch input) together with the user interface module 223 and process a command in accordance with the received input.

The processor 240 is connected to the communication interface 210, the memory 220, and the I/O interface 230 to control an overall operation of the remote service server 200 and may perform various commands to input multi-languages in the remote service by the application or the program stored in the memory 220.

The processor 240 may correspond to an arithmetic device such as a central processing unit (CPU) or an application processor (AP). Further, the processor 240 may be implemented as an integrated chip (IC) such as a system on chip (SoC) in which various arithmetic devices are integrated. Further, the processor 240 may include a module for calculating an artificial neural network model like a neural processing unit (NPU).

Hereinafter, a method for providing a remote service capable of inputting multi-languages to the user terminal 100 by the processor 240 will be described.

Referring to FIG. 5, the processor 240 executes any one service application or web page in accordance with the request of the user terminal 100 in a sandbox-based engine and it may render the executed screen to provide the screen to the user terminal 100 (S101). That is, the processor 240 may provide a screen regarding any one application or web page to the remote service screen of the user terminal 100.

When the remote service connection with the user terminal 100 is established, the processor 240 may detect a position in which a virtual input window may be inserted, in the screen being provided to the user terminal 100 (S102). The processor 240 may provide position information of the virtual input window to the user terminal 100 (S103).

Figure 6:
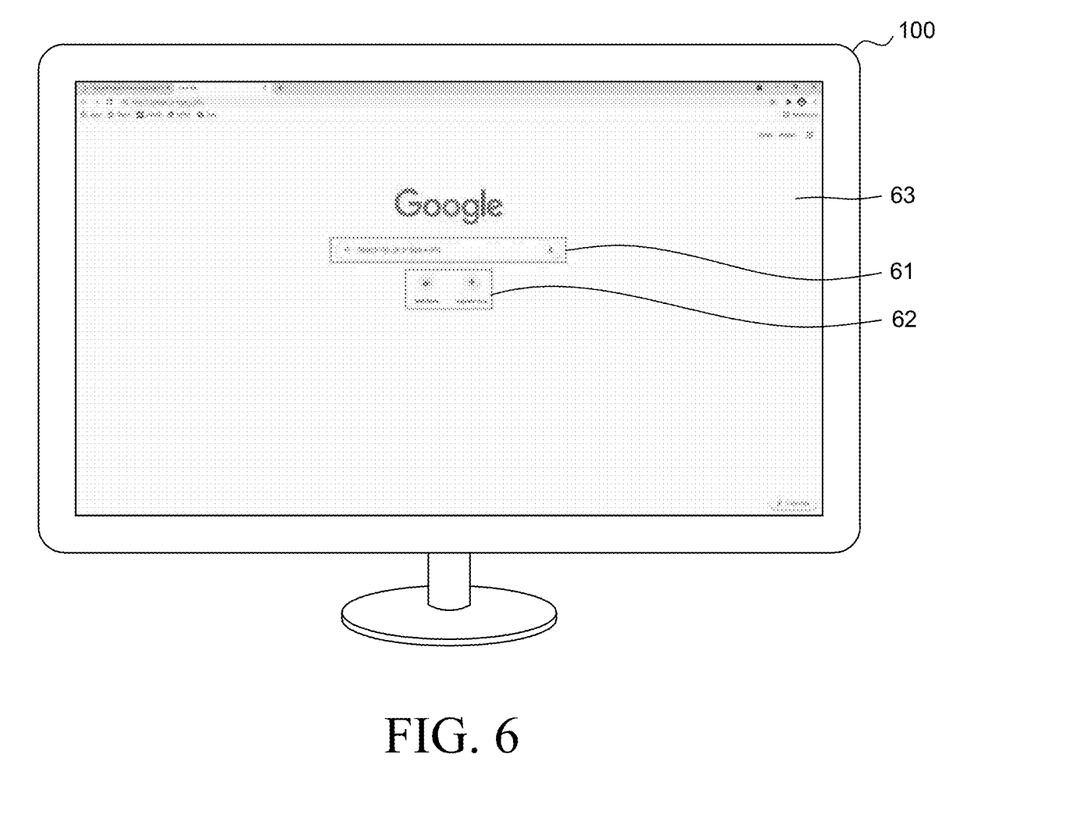

Referring to FIG. 6, the processor 240 may analyze a source code of the remote service screen 61 configured by a web page to detect areas 62 and 63 on which text may be displayed to be defined as "INPUT". The processor 240 may designate the corresponding areas as areas where the virtual input windows may be inserted.

For example, when there is one area where the virtual input window may be inserted, the processor 240 may provide position information (for example, X-Y coordinate information) about the corresponding area 63 to the user terminal 100. Therefore a position of a cursor in the service screen 61 of the user terminal 100 may move to the corresponding position.

Figure 8:
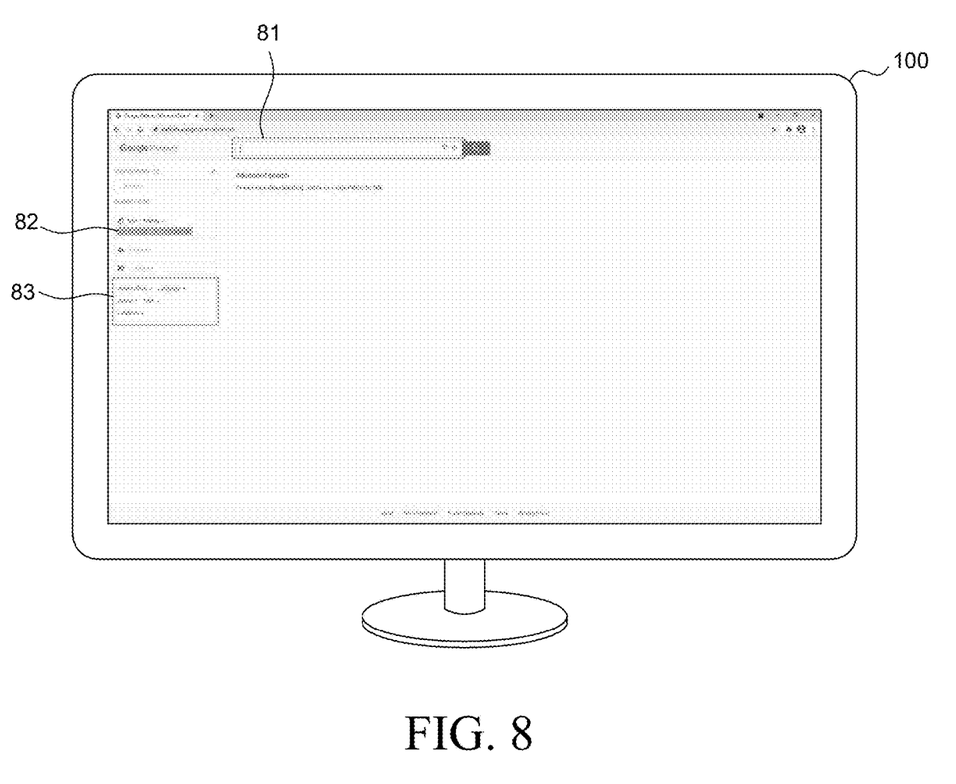

In addition, referring to FIG. 8, when there is a plurality of areas to which a virtual input window is inputted, according to a detection result, the processor 240 may simultaneously provide the position information 81, 82 and 83 into the service screen. The processor 240 may receive selection information of one of them from the user terminal 100 via the communication module 220. For example, the processor 240 may insert and provide a specific icon or a highlight line in an area in the service screen where the virtual input window may be inserted.

Further, in order to assist the user to input the text into the detected area, the processor 240 may provide a guide text for searching to the virtual input window. The guide text may be determined based on a source code of the area detected as a virtual input window area in the service screen. For example, the processor 240 may provide a guide text as highlighted in any one area 83 to which the virtual input window may be inserted.

Referring to FIG. 5 again, as described above, the user terminal 100 receives the position information of the virtual input window. The user terminal 100 may set a position of the virtual input window by the user (S104). The user terminal may acquire a text input into the set position by the user (S105), and provide the text to the remote service server 200 (S106). The text may be letters configured by any one language selected from a plurality of languages, by the user terminal 100. The various user inputs may be acquired from a physical input device connected to the user terminal 100, such as a keyboard, a mouse, or a track pad or a display device of the user terminal 100.

As described above, the processor 240 may generate an input object representing a virtual input window including a text (S107). The processor 240 may provide the input object to the user terminal 100 (S108). According to the exemplary embodiment, the input object may be an image or a video of a partial area of the remote service screen displayed on the user terminal 100. The input object, as illustrated in FIG. 7, may include an image including a text acquired from the user terminal 100 together with the image representing the input window.

As described above, the processor 240 may output or stream the input object in accordance with the type of the input object (S109). That is, the processor 240 may perform an operation of generating and providing an input object by imaging or imaging the entire text through a sandbox-based engine. Accordingly, the user can experience as if an input unit is installed in remote service server 200.

Figure 9A:
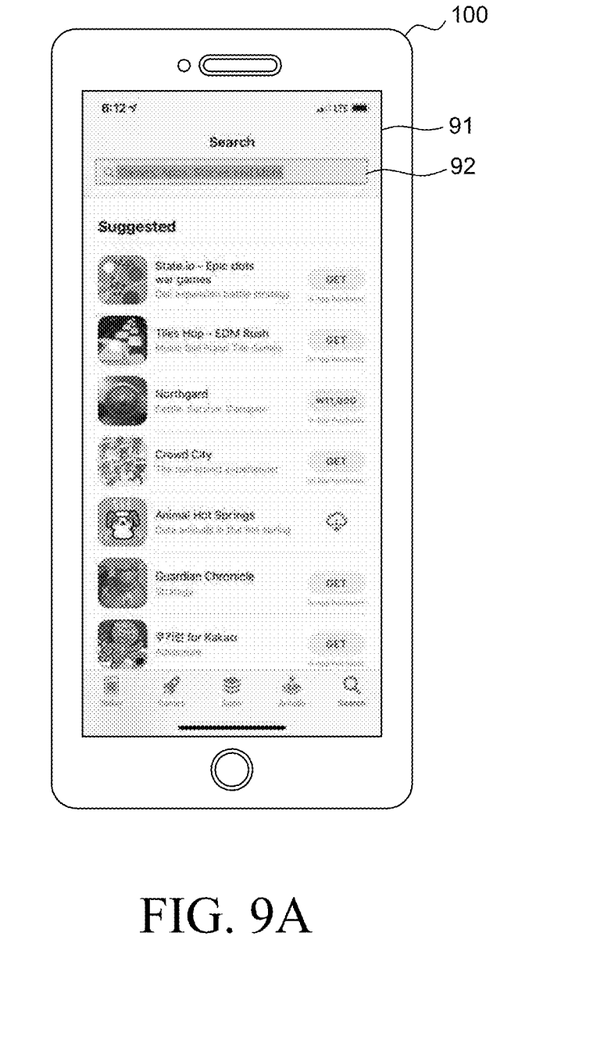
Figure 9B:
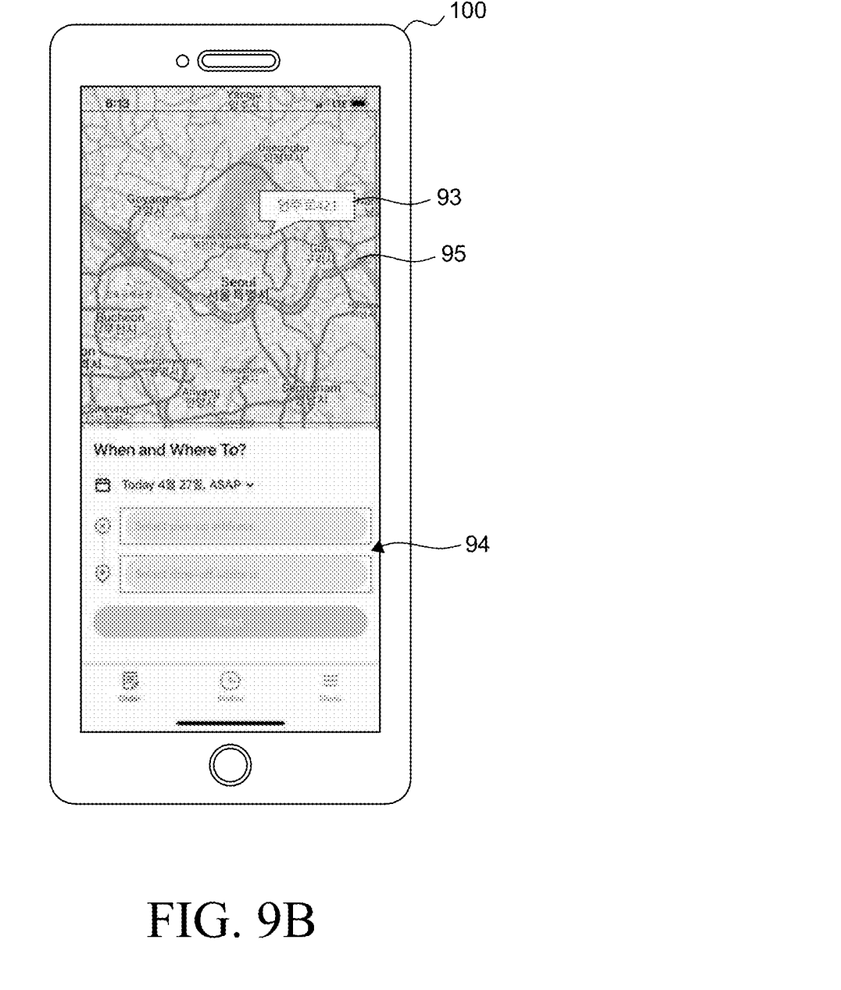

In the meantime, referring to FIG. 9A, the remote service screen provided by the processor 240 may be an application screen 91 as follows, unlike the above-described example. The processor 240 may insert a virtual input window and detect a position 92 where the virtual input window may be inserted and it may receive a text which may be inserted as an input object in accordance with the position of the virtual input window detected from the user terminal 100.

According to another exemplary embodiment, the processor 240 does not designate a position of the virtual input window, but set the position selected by the user terminal 100 as a position of the virtual input window and it may provide the input object to the set position. For example, referring to FIG. 9B, the processor 240 may detect an area denoted by reference numeral 94 as a position where the virtual input window can be inserted. Also, the processor 240 may receive any one point selected in the remote service screen 93 from the user terminal 100. Thereafter, the processor 240 may generate and provide the input object 95 in the selected position.

So far, the configuration of the remote service server 200 according to the exemplary embodiment of the present disclosure and the method of providing the remote service capable of inputting multi-languages has been described.

According to the present disclosure, even though an input device/input interface installed in a user terminal is not implemented in a server which provides a remote service, a text to be input into a remote service screen by a user may be output as an input text, thereby saving development/operation costs of a system which provides the remote service.

Although an exemplary embodiment of the present disclosure has been described in detail with reference to the accompanying drawings, the present disclosure is not limited thereto and may be embodied in many different forms without departing from the technical concept of the present disclosure. Therefore, the exemplary embodiments of the present disclosure are provided for illustrative purposes only but not intended to limit the technical concept of the present disclosure. The scope of the technical concept of the present disclosure is not limited thereto. Therefore, it should be understood that the above-described exemplary embodiments are illustrative in all aspects and do not limit the present disclosure. The protective scope of the present disclosure should be construed based on the following claims, and all the technical concepts in the equivalent scope thereof should be construed as falling within the scope of the present disclosure.

What is claimed is:

1. A method for providing a remote service capable of multi- language input, the method being performed by a processor of a service providing server and comprising:
providing a remote service screen rendered in accordance with a request of a user terminal, the remote service screen being a screen for any one application or web page having a source code;
detecting each of a plurality of areas in the remote service screen in which a virtual input window can be inserted and in which text can be displayed, by analyzing the source code of the remote service screen;
inserting a guide text for searching in a virtual input window corresponding to the any one of the plurality of areas;
receiving a text from the user terminal in real time without receiving a user input of any one of searching, transmitting, or confirming, the received text being acquired from a physical input device connected to the user terminal or from a display device of the user terminal, the received text being provided as a video in the virtual input window;
receiving, from the user terminal, selection information about an area of the virtual input window where the text is to be displayed, the selection information indicating one of the plurality of areas in which text can be displayed;
generating, in response to the received text and selection information, an input object composed of video in real time, the input object including
the text received from the user terminal in real time,
an image of an area corresponding to the selection information and the text, and
a real-time image for a partial area of the remote service screen displayed on the user terminal; and
providing the remote service screen to the user terminal by inserting the input object composed of video into the area of the virtual input window where the text is to be displayed,
wherein the guide text for searching is generated for each of the detected plurality of areas where the virtual input window can by inserted and is determined based on the source code of a corresponding one of the detected plurality of areas, and
wherein the guide text of the corresponding one of the detected plurality of areas is inserted into the area of the virtual input window and serves as a prompt to assist a search performed by user of the user terminal.

2. The method of claim 1, wherein the input object is input in a position selected by the user terminal.

3. The method of claim 1,
wherein the text includes alphanumeric characters of any one language selected among a plurality of languages,
wherein the text is configured and selected by the user terminal,
wherein the service providing server includes a memory communicating with the processor, the memory storing identification information of the user terminal and respectively storing a sandbox-based engine for each of the plurality of languages, the sandbox-based engine generating an input object representing every text for any one of the plurality of languages, and
wherein the processor executes any one service application or web page in accordance with the request of the user terminal in the sandbox-based engine indicated by the stored identification information.

4. A service providing server comprising:
a communication interface;
a memory; and
a processor which is operably connected to the communication interface and the memory,
wherein the processor is configured to
provide a remote service screen rendered in accordance with a request of a user terminal, the remote service screen being a screen for any one application or web page having a source code;
detect each of a plurality of areas in the remote service screen in which a virtual input window can be inserted and in which text can be displayed, by analyzing the source code of the remote service screen;
insert a guide text for searching in a virtual input window corresponding to the any one of the plurality of areas;

receive a text from the user terminal in real time without receiving a user input of any one of searching, transmitting, or confirming, the received text being acquired from a physical input device connected to the user terminal or from a display device of the user terminal, the received text being provided as a video in the virtual input window;
receive, from the user terminal, selection information about an area of the virtual input window where the text is to be displayed, the selection information indicating one of the plurality of areas in which text can be displayed;
generate, in response to the received text and selection information, an input object composed of video in real time, the input object including
the text received from the user terminal in real time,
an image of an area corresponding to the selection information and the text, and
a real-time image for a partial area of the remote service screen displayed on the user terminal, and
provide the remote service screen to the user terminal by inserting the input object composed of video into the area of the virtual input window where the text is to be displayed,
wherein the guide text for searching is generated for each of the detected plurality of areas where the virtual input window can by inserted and is determined based on the source code of a corresponding one of the detected plurality of areas, and
wherein the guide text of the corresponding one of the detected plurality of areas is inserted into the area of the virtual input window and serves as a prompt to assist a search performed by user of the user terminal.

5. The service providing server of claim 4,
wherein the text includes alphanumeric characters of any one language selected among a plurality of languages,
wherein the text is configured and selected by the user terminal,
wherein the service providing server includes a memory communicating with the processor, the memory storing identification information of the user terminal and respectively storing a sandbox-based engine for each of the plurality of languages, the sandbox-based engine generating an input object representing every text for any one of the plurality of languages, and
wherein the processor executes any one service application or web page in accordance with the request of the user terminal in the sandbox-based engine indicated by the stored identification information.

6. The service providing server of claim 4,
wherein the processor is further configured to insert a specific icon or a highlight line into the plurality of areas where the virtual input window can by inserted and the guide text can be provided, and
wherein the guide text is highlighted by the specific icon or the highlight line in the corresponding one of the detected plurality of areas.

7. The method of claim 1, further comprising:
inserting a specific icon or a highlight line into the plurality of areas where the virtual input window can by inserted and the guide text can be provided, and
wherein the guide text is highlighted by the specific icon or the highlight line in the corresponding one of the detected plurality of areas.

* * * * *